Aug. 13, 1946.    G. A. LYON    2,405,585
WHEEL STRUCTURE
Filed July 12, 1943
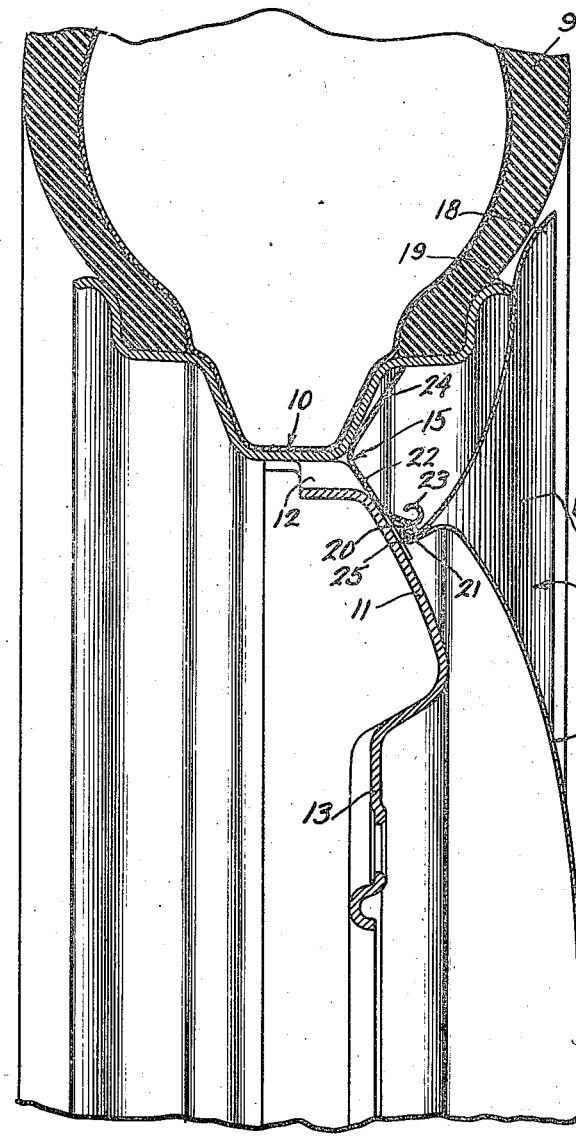
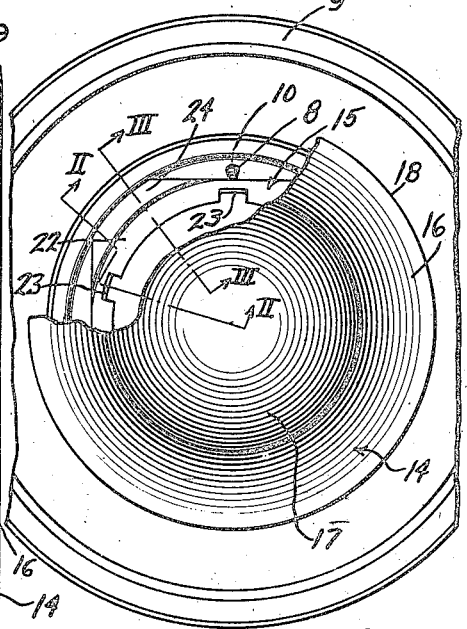
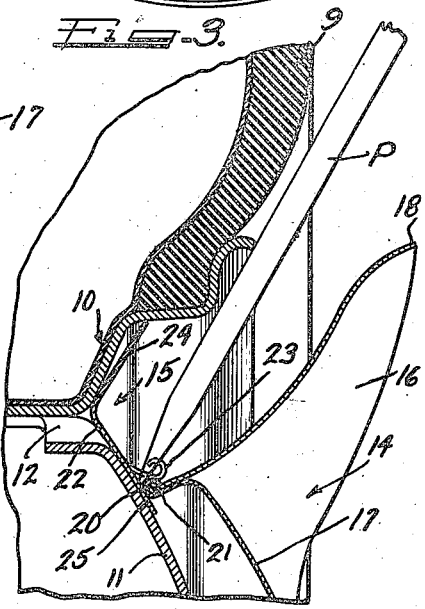
Inventor
GEORGE ALBERT LYON.
by Charles W. Hill Attys.

Patented Aug. 13, 1946

2,405,585

UNITED STATES PATENT OFFICE 2,405,585

WHEEL STRUCTURE

George Albert Lyon, Allenhurst, N. J.

Application July 12, 1943, Serial No. 494,302

9 Claims. (Cl. 301—37)

The present invention pertains to a wheel structure and more particularly to a novel arrangement of cover retaining means and a cover embracing either or both a trim ring and a hub cap.

An object of this invention is to provide a simplified form of wheel trim retaining means.

Another object of the invention relates to the provision of retaining means of such character that the same may become part of the wheel without necessitating its removal each time the wheel trim or cover is removed and which retaining means includes novel spring retaining fingers for cooperation with an edge of the cover.

A further object of this invention is to provide self-retaining cover holding means which lends itself to use with a plastic type of wheel trim or cover.

In accordance with the general features of this invention there is provided a cover retaining means for detachably holding a wheel trim or cover on a wheel which cover means comprises a ring having on its outer periphery diametrically opposed retaining fingers adapted to be wedged into engagement with a flange of the tire rim and having on its inner peripheral portion circularly spaced retaining fingers providing shoulder means behind which an edge of the cover or trim is adapted to be resiliently pressed into retaining cooperation therewith.

In accordance with other features of this invention there is provided a wheel structure including a multi-flanged tire rim and body part, a cover retaining ring having an inner marginal portion provided with a plurality of fingers which constitute shoulder means over which an edge of a cover is adapted to be snapped into retained engagement therewith, and also having four radial corner portions formed into inclined radially outwardly extending fingers for resilient snap-on engagement with the rim of the wheel.

Still another feature of the invention relates to the provision of cover retaining means which is particularly adapted for use in the retention of a plastic cover on the wheel including an annular portion of plastic material of self-sustaining form and which is highly resilient so that it will always tend to return to its initial or normal position after each deflection or deformation of the same; such annular portion being manually deflectable away from the wheel to afford access to the rear of the same without necessitating removal of the cover to effect such deflection and further enabling the introduction of a pry-off tool behind the annular portion when it is desired to pry the cover free of the wheel.

Other objects and features of this invention will more fully appear from the following detailed description taken in connection with the accompanying drawing which illustrates a single embodiment thereof and on which:

Figure 1 is a side view of a wheel structure embodying the features of this invention and in which the cover is partly broken away to show the cover retaining ring.

Figure 2 is an enlarged fragmentary cross-sectional view taken on the line II—II of Figure 1 looking in the direction indicated by the arrows showing the manner in which the cover is held on the wheel by the cover retaining ring, and Figure 3 is a fragmentary cross-sectional view similar to Figure 2 but taken on a different line in Figure 1, namely on the line III—III of Figure 1 so as to show how the pry-off tool may be inserted behind the outer annular portion of the cover after that portion has been manually deflected away from the wheel.

In the drawing:

The reference character 9 designates generally a conventional type of tire having the usual pneumatic tube and which tire has its beads mounted in the conventional multi-flanged drop center type of tire rim designated by the reference character 10. As is well known, the rim 10 is carried on a load bearing part or wheel body or spider stamping 11 attached at spaced intervals to the base flange of the rim; there being the usual transverse ventilation openings 12 between the points of attachment of the spider to the rim.

The wheel body part or spider 11 is of the usual dished type and includes at its center a bolt-on flange 13 by means of which the wheel may be detachably mounted on an axle or suitable support as is well known in the art.

It is, of course, understood that the tire or the tube thereof is provided with the usual valve stem which is shown at 8 in Figure 1 and which is provided for the purpose of introducing or removing air from the tube in the tire. This valve stem 8 extends thru one of the side flanges of the tire rim as is, of course, old in the art, and may be of any desired length.

Associated with an outer exposed side of the tire and wheel is a circular cover designated generally by the reference character 14 embracing the features of this invention and which cover as illustrated comprises an outer annular trim ring 16 and a central hub cap 17. This multipart cover or wheel trim 14 is adapted to be detachably held on the wheel by means of novel retaining means embodying the features of this invention and designated generally by the reference character 15.

The annular trim ring part 16 of the wheel cover has an outwardly flared or turned lip 18 which extends radially beyond the outermost edge of the tire rim 10 and is positioned to overlie a part of the side wall of the tire 9. By slightly turning the lip 18 outwardly it is possible to prevent it from biting into the side wall of the tire and yet this construction enables the trim ring, by reason of its curved convex cross-sectional contour, to appear to be a continuation of the side wall of the tire. For illustration, if this trim ring 16 is given a white external finish, it will, when it is in position on the wheel, cause the tire to appear to have a white side wall in which the side wall portion is the trim ring 16, such trim ring extending clear down to the hub cap 17.

The outer edge of the hub cap 17 is curled or rolled at 20 upon itself so as to interlock therewith the inner edge 21 of the trim ring 16 with the hub cap thus causing the cover 14 to be a unitary device.

In view of the desire of automotive engineers to reduce to a minimum the unsprung weight of an automobile wheel, I have found it very desirable to make my wheel cover 14, or at least the trim part 16, of a light, plastic material. I have attained excellent results in the use of a thermoplastic material known in the trade as "ethylcellulose." By making the trim ring 16 of such a material which is self-sustaining in form and yet highly resilient, it is possible to provide the trim ring with the necessary resilient characteristics whereby its outer peripheral or lip portion 18 may be manually engaged and deflected manually away from the tire as shown in Figure 3 for the purpose of affording access to the rear side of the same. This access may be for the purpose of getting to the valve stem or as shown in Figure 3 may be for the purpose of enabling the introduction of a pry-off tool P behind the trim ring part 16. Upon the release of the trim ring 16 I find that by reason of the resilient characteristics of the material it will immediately snap back into the position shown in Figure 2 in which it abuts the outer edge of the wheel rim at 19.

While it is to be understood that the hub cap 17 may if it is so desired be made of a thermoplastic material, I have also attained excellent results by making this hub cap of a light metallic sheet material which enables the provision of the requisite rigidity at the turned outer edge 20 where this part 17 is interlocked to the part 16 and also where the pry-off end of the tool is adapted to be applied for the purpose of forcibly ejecting the cover 14 out of its retained cooperation with the retaining means or ring 15. The application to and removal of the cover 14 from the wheel is such that the same does not in any way require the removal of the retaining ring 15 which is held in place between the body part 11 and the tire rim 10.

The retaining ring 15 of my invention, as best shown in Figure 1, is in reality an annular ring having four corners 24 formed into retaining fingers for holding the ring on the wheel. These corners or fingers in reality constitute the four corners of a blank from which the ring is blanked and each has its extremity slightly rounded so as to fit into the axial flange of the tire rim which is to be resiliently gripped by the fingers 24. Thus I am enabled to utilize parts of the square blank which would otherwise be waste if the same were removed and fingers applied to the outer margin of the ring 15.

The main annular portion 22 of this ring 15, as best shown in Figure 2, is inclined rearwardly to its point of junction with the four corners 24 which are, in turn, inclined outwardly from the point of junction. Thus the ring 15 has a somewhat dished configuration insofar as its cross section is concerned. The annular body part of the ring 22 has struck or blanked therefrom at spaced intervals a plurality of curled resilient fingers 23 each of which defines a shoulder for retaining cooperation with the curled outer edge 20 of the hub cap 17. The shoulders afforded by these fingers 23 are arranged in a common circle which is of a different diameter than that of the turned edge 20 so as to require relative movement as between these shoulders and the turned edge 20 in the application to and removal of the cover with respect to the wheel. By making the ring 15 of a resilient metallic material the requisite resiliency may be provided in the fingers 23 in order to permit of this relative movement as between the fingers and the turned edge 20 in the pressing of the cover axially into retained cooperation with the fingers 23. In other words, the turned edge 20 is pressed over or cammed over the shoulders of the fingers 23 until the same is behind the shoulders and is resiliently held tightly against the underlying edge portion 25 of the wheel ring 15 which bears on the wheel body 11.

As noted before, this cover of my invention is easily removable by flexing the trim ring portion 16 away from the wheel and inserting a pry-off tool P therebehind so as to bring the same into register with the turned edge 20 after which a force may be applied to the tool P for the purpose of forcibly ejecting the cover 14 out of its retained engagement with the fingers 23 of the retaining ring 15. It is, of course, to be understood that the retaining fingers 23 may be of any suitable number such, for example, as four or five, as long as the number of fingers provided are sufficient to properly retain the cover on the wheel. Also, it should be noted from Figures 1 and 2 that the body part 22 of the retaining ring 15 overlies the wheel openings 12 so that such body part or portion may be utilized for the purpose of covering such openings should it be desirable not to permit the circulation of air therethrough. This would be advantageous from the standpoint of preventing the accumulation of dirt and other material behind the trim ring 16. In some cases it is possible to cover the openings 12 and this is particularly true where the brake drum attached to the wheel is adequately ventilated. The brake drum is not shown, however, since it is of a conventional construction and is now well known in the art as is evidenced by the many patents granted on conventional wheels.

I claim as my invention:

1. In a wheel structure including a multi-flanged tire rim and a body part, a cover-retaining ring having a central annular portion with shoulder means over which an edge of the cover is adapted to be snapped into retained engagement therewith and also having four radial corner portions formed into inclined radially outwardly extending fingers for resilient snap-on retaining engagement with the rim of the wheel and a circular cover having an edge portion pressed axially behind said shoulder means for concealing one of the parts of the wheel said shoulder means comprising spaced fingers on an inner margin of said ring each having a shoulder behind which said edge portion of said cover is adapted to be pressed.

2. In a wheel structure including a multi-flanged tire rim and a body part, a cover-retaining ring having a central annular portion with shoulder means over which an edge of the cover is adapted to be snapped into retained engagement therewith and also having four radial corner portions formed into inclined radially outwardly extending fingers for resilient snap-on retaining engagement with the rim of the wheel and a circular cover having an edge portion pressed axially behind said shoulder means for concealing one of the parts of the wheel, said shoulder means comprising spaced fingers on an inner margin of said ring each having a shoulder behind which said edge portion of said cover is adapted to be pressed, said finger shoulders being arranged in a circle of a diameter different from that of said inner cover edge portion so as to require relative resilient movement of said edge portion and said fingers in the pressing of the cover home into retained engagement with said fingers.

3. In a wheel structure including a multi-flanged tire rim and a body part, a cover-retaining ring having a central annular portion with shoulder means over which an edge of the cover is adapted to be snapped into retained engagement therewith and also having four radial corner portions formed into inclined radially outwardly extending fingers for resilient snap-on retaining engagement with the rim of the wheel and a circular cover having an edge portion pressed axially behind said shoulder means for concealing one of the parts of the wheel, said shoulder means comprising spaced fingers on an inner margin of said ring each having a shoulder behind which said edge portion of said cover is adapted to be pressed, said cover including an annular trim ring of a radial depth to conceal the exposed outer flanges of the rim and made of a plastic material which has a physical property of being self-sustaining with respect to form and yet being resiliently resistant to permanent deformation, the outer edge of said trim ring being manually deflectable for the purpose of bodily flexing a portion of the trim ring away from the rim in order to afford access to the rear side thereof.

4. In a wheel structure including a multi-flanged tire rim and a body part, a cover-retaining ring having a central annular portion with shoulder means over which an edge of the cover is adapted to be snapped into retained engagement therewith and also having four radial corner portions formed into inclined radially outwardly extending fingers for resilient snap-on retaining engagement with the rim of the wheel and a circular cover having an edge portion pressed axially behind said shoulder means for concealing one of the parts of the wheel, said shoulder means comprising spaced fingers on an inner margin of said ring each having a shoulder behind which said edge portion of said cover is adapted to be pressed, said cover including a central hub cap for covering a portion of the wheel body and having an outer peripheral turned portion of a diameter different from that of a circle in which said finger shoulders are arranged so as to require relative resilient movement of said edge portion and said fingers in the pressing of the cover home into retained engagement with said fingers.

5. In a wheel structure including a multi-flanged tire rim and a body part, a cover-retaining ring having a central annular portion with shoulder means over which an edge of the cover is adapted to be snapped into retained engagement therewith and also having four radial corner portions formed into inclined radially outwardly extending fingers for resilient snap-on retaining engagement with the rim of the wheel and a circular cover having an edge portion pressed axially behind said shoulder means for concealing one of the parts of the wheel, said shoulder means comprising spaced fingers on an inner margin of said ring each having a shoulder behind which said edge portion of said cover is adapted to be pressed, said cover including a central hub cap for covering a portion of the wheel body and having an outer peripheral turned portion of a diameter different from that of a circle in which said finger shoulders are arranged so as to require relative resilient movement of said edge portion and said fingers in the pressing of the cover home into retained engagement with said fingers, said turned edge portion of said hub cap having secured therein an inner edge of a trim ring of a radial depth to conceal the outer flanges of the rim and made of a plastic material which has a physical property of being self-sustaining with respect to form and yet being resiliently resistant to permanent deformation, the outer edge of said trim ring being manually deflectable for the purpose of bodily flexing a portion of the trim ring away from the rim in order to afford access to the rear side thereof.

6. In a wheel structure including a multi-flanged tire rim and a body part, a cover-retaining ring having a central annular portion with shoulder means over which an edge of the cover is adapted to be snapped into retained engagement therewith and also having four radial corner portions formed into inclined radially outwardly extending fingers for resilient snap-on retaining engagement with the rim of the wheel and a circular cover having an edge portion pressed axially behind said shoulder means for concealing one of the parts of the wheel, said shoulder means comprising spaced fingers on an inner margin of said ring each having a shoulder behind which said edge portion of said cover is adapted to be pressed, said cover including a central hub cap for covering a portion of the wheel body and having an outer peripheral turned portion of a diameter different from that of a circle in which said finger shoulders are arranged so as to require relative resilient movement of said edge portion and said fingers in the pressing of the cover home into retained engagement with said fingers and a trim ring having an inner peripheral edge of a diameter such that it may be resiliently flexed over the top of the hub cap and be retained in engagement therewith behind the turned edge of the hub cap whereby said shoulder means can retain both the hub cap and the trim ring on the wheel, said trim ring extending radially outwardly for concealing the outer side flanges of the tire rim.

7. In a wheel structure including a multi-flanged tire rim and a body part, a cover-retaining ring having a central annular portion with shoulder means over which an edge of the cover is adapted to be snapped into retained engagement therewith and also having four radial corner portions formed into inclined radially outwardly extending fingers for resilient snap-on retaining engagement with the rim of the wheel and a circular cover having an edge portion pressed axially behind said shoulder, means for concealing one of the parts of the wheel, said shoulder means comprising spaced fingers on an inner margin of said ring each having a shoulder behind which said edge portion of said cover is adapted to be pressed, said cover including an annular trim ring of a radial depth to conceal the exposed outer flanges of the rim and made of a plastic material which has a physical property of being self-sustaining with respect to form and yet being resiliently resistant to permanent deformation, the outer edge of said trim ring being manually deflectable for the purpose of bodily flexing a portion of the trim ring away from the rim in order to afford access to the rear side thereof, the outer peripheral margin of the trim ring including said edge thereof extending beyond the rim alongside of the tire in a position where it is slightly turned axially outwardly so as not to bite into the side wall of the tire and yet be readily accessible for manual engagement.

8. In a wheel structure including a multi-flanged tire rim and a body part, a cover-retaining ring having a central annular portion with shoulder means over which an edge of the cover is adapted to be snapped into retained engagement therewith and also having four radial corner portions formed into inclined radially outwardly extending fingers for resilient snap-on retaining engagement with the rim of the wheel and a circular cover having an edge portion pressed axially behind said shoulder means for concealing one of the parts of the wheel, said shoulder means comprising spaced fingers on an inner margin of said ring each having a shoulder behind which said edge portion of said cover is adapted to be pressed, said edge portion of the cover overlapping the inner margin of said retaining ring and being turned so that a pry-off tool may be inserted thereunder between the fingers on the retaining ring for the purpose of prying the cover off of the wheel without removing the retaining ring.

9. In a wheel structure including a wheel having tire rim and body parts, a cover retaining ring having an inner annular portion provided with shoulder means over which an edge of the cover is adapted to be pressed into retained engagement therewith and also having a plurality of outwardly extending portions formed into inclined radially outwardly extending fingers for resilient snap-on retaining engagement with the said rim part of a wheel, said shoulder means comprising a plurality of spaced resilient fingers extending axially outwardly from the inner margin of the retaining ring, said fingers engaging said body part so as to be backed up thereby and having their extremities spaced from said body part to define a cover edge receiving opening between them and said body part.

GEORGE ALBERT LYON.